United States Patent [19]
Larkin

[11] 3,814,204
[45] June 4, 1974

[54] DUAL STEERING FOR TILT-CAB VEHICLE
[75] Inventor: Robert F. Larkin, Lincoln Park, N.J.
[73] Assignee: Ecolotec Inc., Kenilworth, N.J.
[22] Filed: Aug. 21, 1972
[21] Appl. No.: 282,063

[52] U.S. Cl.......................... 180/89, 74/493, 74/494
[51] Int. Cl.......................... B62d 1/22, B62d 39/00
[58] Field of Search............ 180/89 A, 77 S, 78, 89; 74/494, 493; 280/96

[56] References Cited
UNITED STATES PATENTS
| | | | |
|---|---|---|---|
| 1,182,056 | 5/1916 | Thompson | 74/425 |
| 2,740,487 | 4/1956 | Murty et al. | 180/89 A |
| 2,845,133 | 7/1958 | Norrie et al. | 180/89 A X |
| 2,937,881 | 5/1960 | Norrie et al. | 180/89 A X |

FOREIGN PATENTS OR APPLICATIONS
| | | | |
|---|---|---|---|
| 570,981 | 1/1924 | France | 74/494 |
| 1,124,683 | 7/1956 | France | 180/89 A |
| 9,567 | 9/1908 | France | 74/494 |
| 456,389 | 2/1928 | Germany | 74/494 |

Primary Examiner—Robert B. Reeves
Assistant Examiner—Frederick R. Handren

[57] ABSTRACT

A dual steering conversion mechanism utilizing two gear means interconnected by an extensible rod positioned within a pivotally mounted cab-over-engine vehicle for alternative control from one of two positions within the cab. Steering torque generated at either position is delivered to the steerable wheels via a gear means which is slidably and pivotally connected to the cab, permitting the cab to be tilted forward.

5 Claims, 8 Drawing Figures

DUAL STEERING FOR TILT-CAB VEHICLE

BACKGROUND OF THE INVENTION

1. Field of the Invention

This invention relates to a dual steering conversion mechanism specifically for addition of an alternative control position within a pivotally mounted cab-over-engine vehicle.

2. Description of the Prior Art

Dual steering mechanisms in the prior art typically consist of a chain-and-sprocket system as in U.S. Pat. No. 3,451,571. No dual steering mechanisms have found practical use in tilt cab vehicles apparently due to the special difficulties presented by the relative movement between the cab and chassis.

SUMMARY OF THE INVENTION

The invention provides directional control of the vehicle from either of two positions in the cab and is particularly adapted for use on a truck having mounted thereon street maintenance equipment such as painting or cleaning equipment, the operation of which requires careful control from alternative sides of the vehicle.

The invention also provides a dual steering system by adding to the existing steering mechanism an additional control means which is easily installed using a pair of gear means wherein standard worm and worm-wheel gearing is used advantageously to transmit torque between the two essentially parallel control means by an interconnecting extensible rod.

The invention also provides an attachment means between the enclosure of a first gear means and the cab for restricting any turning of a first holding means due to torque generated by the steering system while permitting the motion necessary to allow the cab to tilt.

DESCRIPTION OF THE PREFERRED EMBODIMENT

Figure 1:
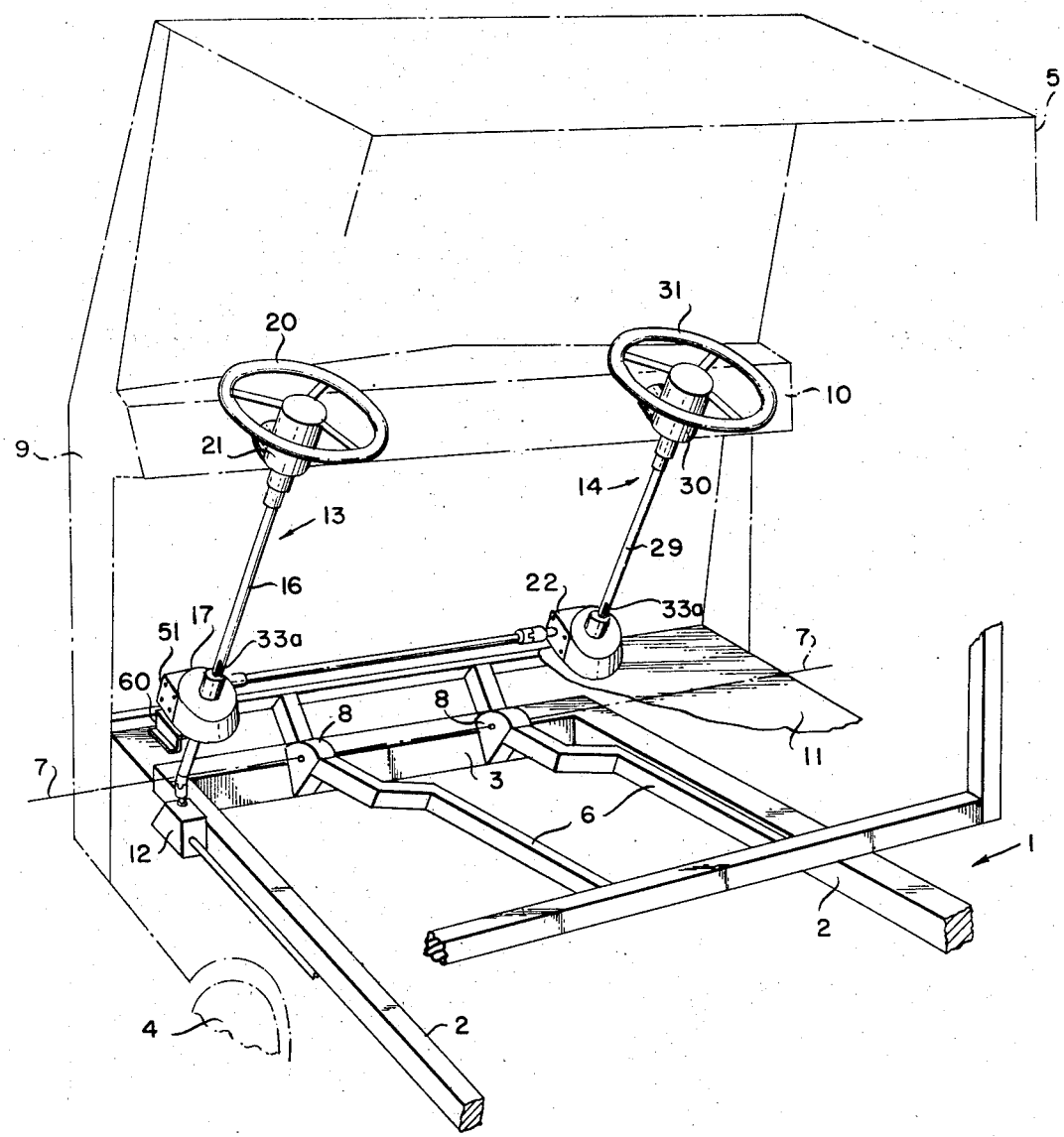
FIG. 1 is a perspective view of the present invention installed in a tilt cab vehicle.

Referring to FIG. 1, a vehicle comprises a chassis 1 having side members 2 and front member 3. The chassis rides on a pair of steerable wheels 4 and at least one pair of non-steerable wheels, not shown. A tilt cab 5, supported by framing members 6, may be tilted forward from the position shown about an axis 7 which is defined by cab-frame support members 8 attached to the front chassis member. The cab further comprises a body 9, firmly attached to the cab-frame support members, including an instrument board 10 and cab flooring 11.

The vehicle also comprises a power source consisting of a suitable engine, transmission and drive train with the necessary associated accelerators, brakes, and clutches, etc., not shown. The brakes, accelerator, clutches and the like can be modified to the extent necessary and in a known manner to accommodate the tilt cab construction as is done when using a single steering mechanism. The vehicle is provided with such other conventional apparatus as may be necessary for the correct operation and control of the vehicle.

The steerable wheels are angularly directed by directing means in conjunction with the associated vehicle suspension apparatus, not shown, which is completely conventional and standard equipment on such a vehicle. The directing means is connected to a torque transfer means 12, which is attached to the chassis side member 2. The torque transfer means transfers steering torque, generated at a first and second manually operable steering control means, 13 and 14, respectively, located within the cab, to the directing apparatus.

Figure 2:
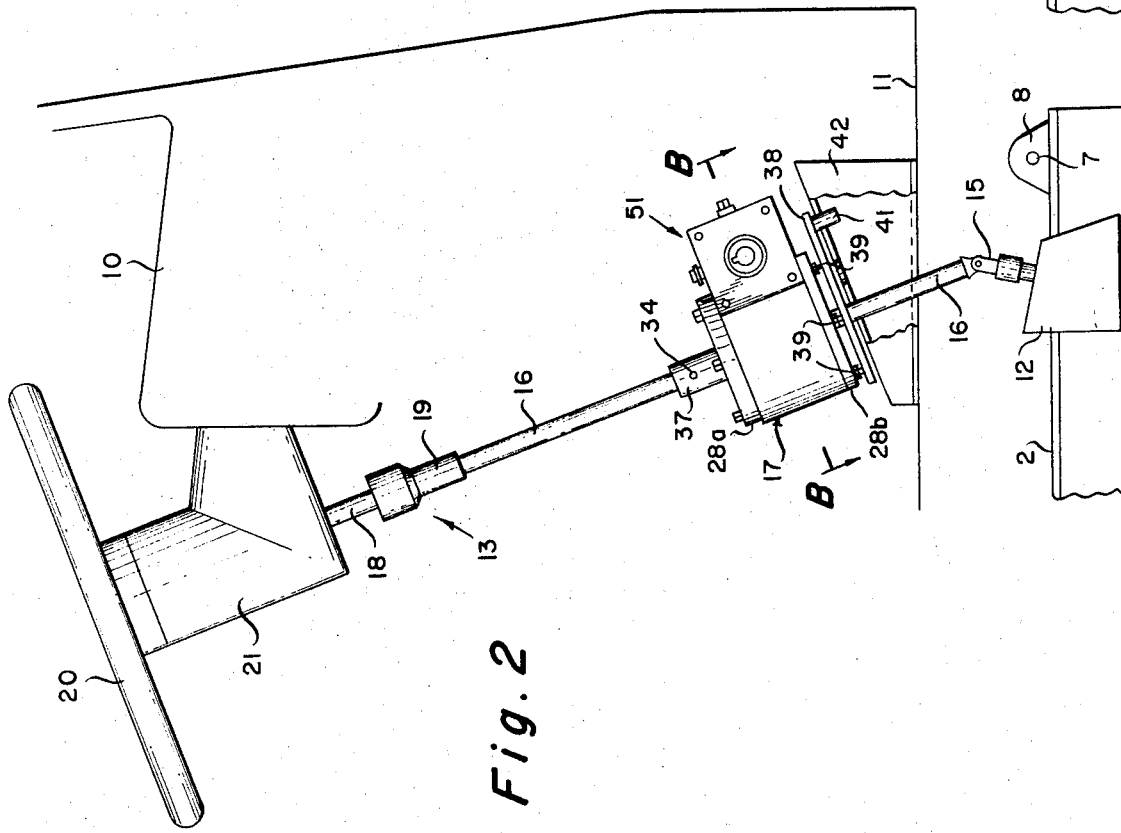
FIG. 2 is a side elevation view of the first control means from FIG. 1 in the attitude of normal operation of the vehicle.

FIG. 2 shows the first steering control means and torque transfer means in relation to the cab floor and instrument board when the cab is in its normal operating position. The torque transfer means is fixedly attached to the chassis side member 2 and connected to the universal joint 15, which is in turn connected to the lower steering shaft 16 of the first control means. The lower steering shaft penetrates the cab floor and a first gear means 17. The first gear means 17 transfers steering torque generated at the second control means to the lower steering shaft. The lower steering shaft connects to the upper steering shaft 18 by a universally jointed, keyed, slidable means 19 for allowing skew motion while restricting axial rotation of the upper and lower shafts relative to one another. The upper steering shaft is connected to the first steering handle 20 and constrained to axial rotation and longitudinal motion by the first steering shaft housing 21 which is in turn firmly attached to the cab at the instrument board. The first control means, which is original equipment provided with the vehicle, comprises the first steering handle, first steering shaft housing, upper and lower steering shafts, and the interconnecting universally jointed, keyed, slidable means.

Figure 4:
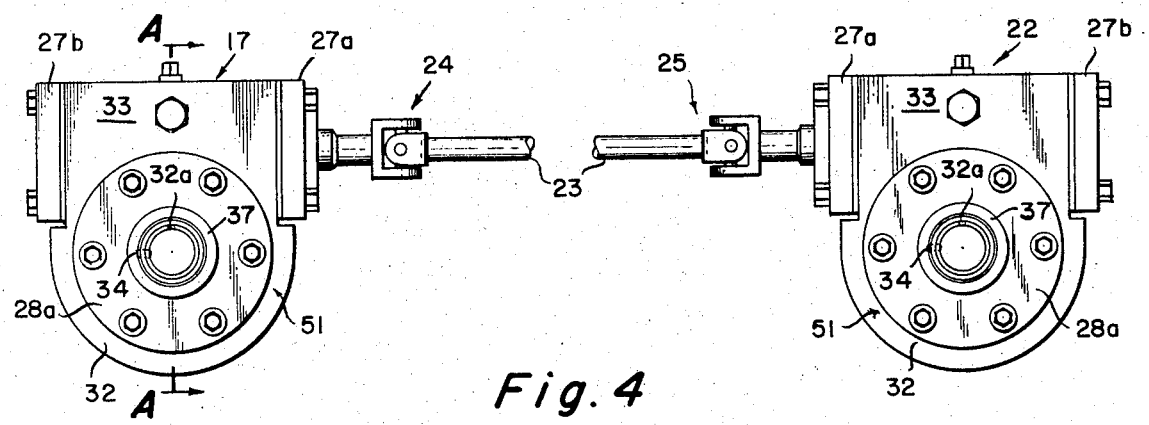
FIG. 4 is a top elevation view of the first and second gear means from FIG. 1 showing the interconnecting extensible rod.

FIG. 4 shows the first gear means 17 connected to a similarly constructed second gear means 22 by a rod 23 and two universally jointed, keyed, slidable means 24 and 25 for allowing skew motion while still restricting the axial rotation of the rod relative to the gear means. The two universally jointed means also permit skew motion of the first gear means relative to the second gear means.

Although only one of the two universally jointed means is necessarily slidable for allowing the change in position of the first gear means relative to the second gear means, both universally jointed means can be slidable allowing easier relative movement and some redundancy in the manufacture of the universally jointed, keyed, slidable means.

Referring again to FIG. 1, the second gear means is connected to a second steering shaft 29 of the second control means 14. The second control means further comprises a second steering shaft housing 30, fixedly attached to the cab at the instrument board, constraining the associated steering shaft to axial rotation, and a second steering handle 31, firmly attached to the associated steering shaft 29, located at the position essentially parallel to and positionally displaced from the first steering handle. The lower end of the second steering shaft is constrained to axial rotation by the second gear means, the holding means of which is fixed to the tilt cab body.

Figure 5:
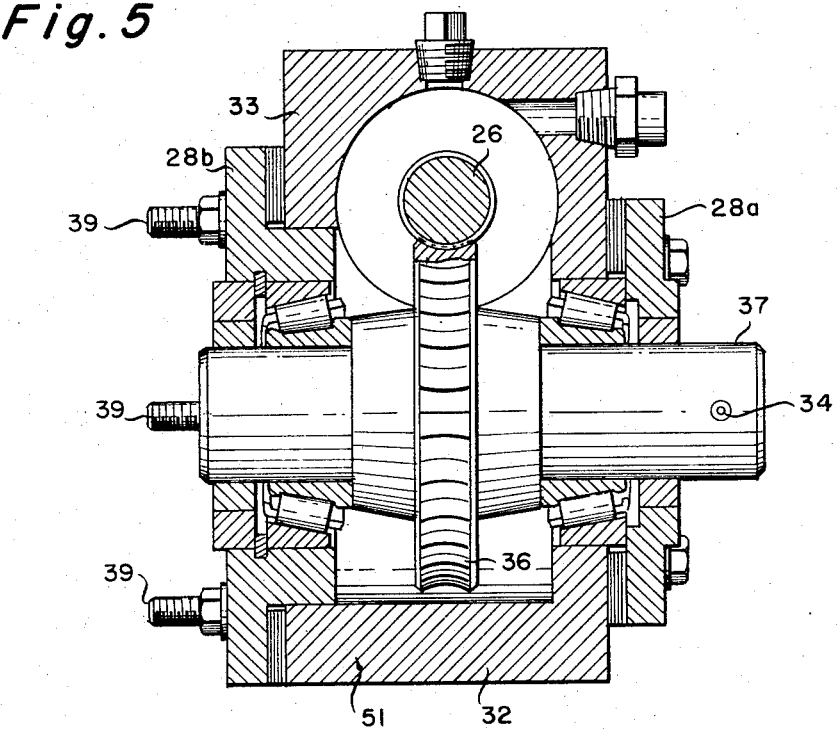
FIG. 5 is a sectional view of the gear means along line A—A from FIG. 4.
Figure 6:
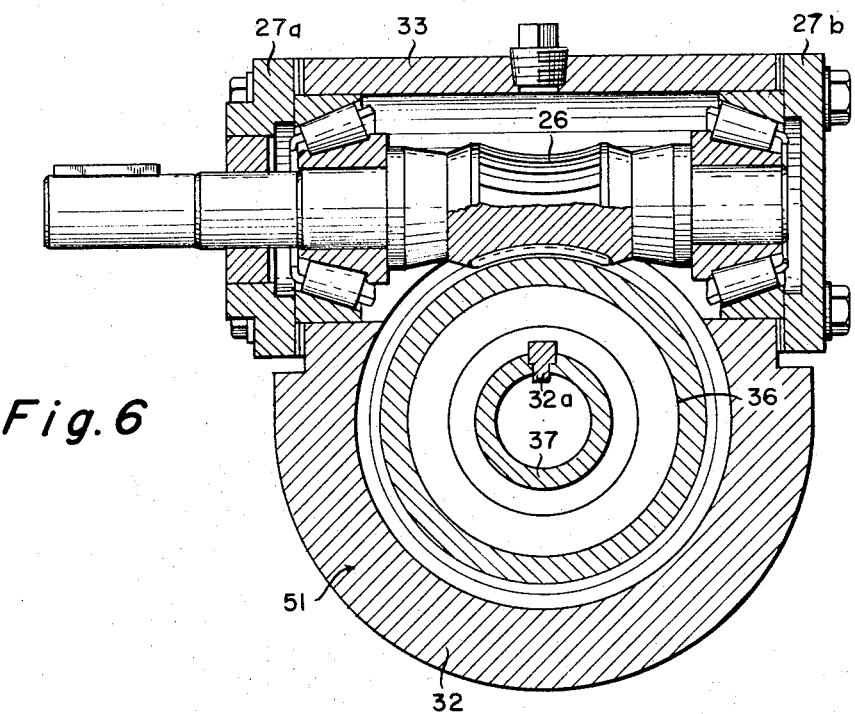
FIG. 6 is a sectional view of the gear means along line B—B from FIG. 2.

Now referring to FIGS. 5 and 6, the first and second gear means are of similar construction comprising a standard, double enveloping worm and worm-wheel gear aligned by a holding means 51 for maintaining the correct operable intermeshing of the gear means. The holding means also may protect and contain lubricant for the gear means. The holding means 51 as shown comprises an enlarged semicircular case 32, matching box member 33, and four end caps 27a, 27b, 28a and 28b. Other substantially equivalent gear means, such as bevel gears in a suitable holding means for aligning the gear means could also be used. A study of the drawings will enable one skilled in the art to see the features common to the two gear means. The worm gear 26 and associated open end cap 27a and closed end cap 27b are exchangeable, end for end, to change the gear means from one type of gear means to the other. The worm wheel 36 is fixed to a collar 37 by a key 32a which also is engaged in a key way 33a cut in the associated steering shaft. The associated steering shaft is further secured by a set screw 34 in the collar being set tightly against the steering shaft.

Figure 3:
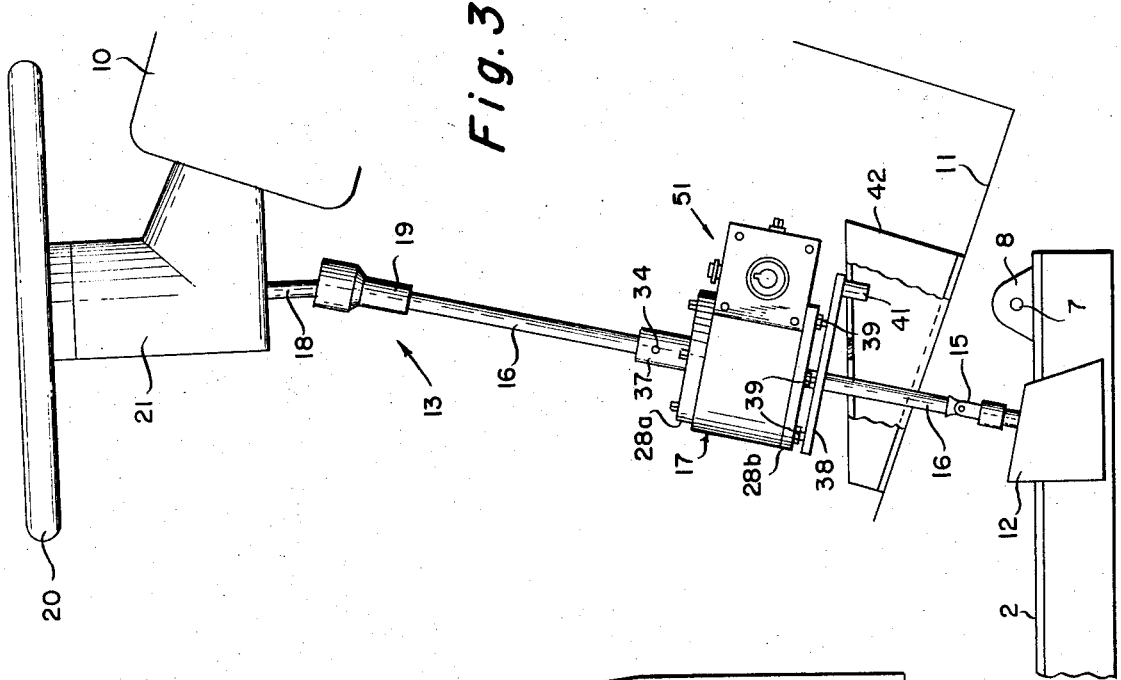
FIG. 3 is a side elevation view of the first control means from FIG. 2 in the attitude achieved when the cab is tilted.

In order that the invention function satisfactorily, the holding means associated with the first gear means must be free to move relative to the cab when the cab is tilted as illustrated in FIG. 3, but it must be prevented from rotating when steering torque is generated at either steering control means. An attachment means 60 for slidably and pivotally connecting the first holding means to the tilt cab restricts the first holding means from any rotation due to steering torque.

Figures 7, 8:
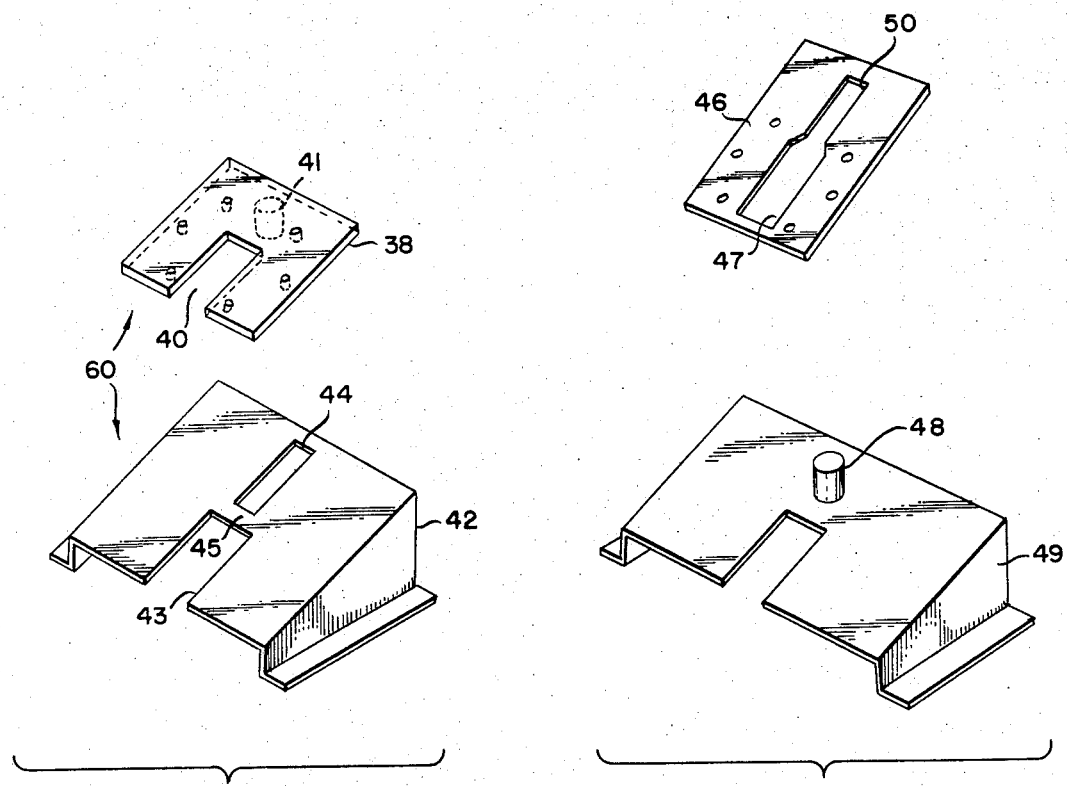
FIG. 7 is a perspective view of the preferred embodiment of the attachment means from FIG. 3.
FIG. 8 is a perspective view of an alternate embodiment of the attachment means from FIG. 7.

A plate 38 of the preferred embodiment as shown in FIG. 7 is attached to the studs 39 extending beyond the bottom end cap 28b. The plate has an edge defining a slot 40 into which the lower steering shaft easily fits. The plate is slidably and pivotally engaged by a pin 41 extending away from the first holding means perpendicular to rod 23 and parallel to the lower steering shaft. A stand 42, fixedly attached to the tilt cab, has an edge defining a slot 43 into which the lower steering shaft easily fits and another slot 44 into which the pin 41 is slidably engaged. The bridge 45 between the two slots may be eliminated thus making the two slots 43 and 44 continuous and generally linear extensions of each other.

Another embodiment of the attachment means is shown in FIG. 8 wherein the plate 46, which would be located similar to plate 38, has a slot 47 into which both the lower steering shaft and a pin 48 will easily fit. The pin is located on stand 49 extending toward the first holding means parallel to the lower steering shaft and functions similarly to pin 41. A reduction 50 in the slot width may be convenient for in all of the embodiments the dimension in one direction of the slot into which the associated pin engages must closely approximate the diameter of the pin thereby providing a close fit of the pin in the slot and thus restricting any turning of the first holding means due to steering torque. The pin must be of such a length as to ensure continuous engagement in the slot. It will be readily apparent that the attachment means and the holding means may be made as a unitary structure to whatever extent desired.

SUMMARY

In a practical embodiment, in order to provide alternative operable control of a standard tilt cab vehicle, a dual steering conversion mechanism is mounted within the cab in such a manner as to permit the cab to be tilted forward when necessary. This cab is equipped with conventional directing means for governing the angular direction of the steerable wheels upon which the motor vehicle travels, torque transfer means for transferring steering torque to such directing means, and a first conventional manually operable steering control means located within the tilt cab connected to the torque transfer means by a universal joint for generating said steering torque. The dual steering conversion mechanism comprises a second manually operable steering control means positionally displaced from the first control means for alternatively generating said steering torque, a rod, adapted to be extended, operably interconnecting the first and second control means for transferring steering torque from the second control means to the first control means, a first gear means operably connected between the rod and the first control means for transferring steering torque generated at the second control means from the rod to the first control means, and a second gear means operably connected between the second control means and the rod for transferring steering torque generated at the second control means from the second control means to the rod.

I claim:

1. In a tilt cab vehicle having directing means for governing the angular direction of steerable wheels upon which the vehicle travels, torque transfer means for transferring steering torque to the directing means, a first manually operable steering control means located within the tilt cab connected to the torque transfer means for generating said steering torque, the improvement comprising a second manually operable steering control means within the tilt cab positionally displaced from the first control means for alternatively generating said steering torque, a rod adapted to be extended operably interconnecting the first and second control means for transferring steering torque from the second control means to the first control means, a first gear means operably connected between the rod and the first control means for transferring steering torque generated at the second control means from the rod to the first control means, a second gear means operably connected between the second control means and the rod for transferring steering torque generated at the second control means from the second control means to the rod, a first holding means aligning the first gear means for correct intermeshing of the gear means and an attachment means slidably and pivotally attaching the first holding means to the tilt cab for restricting the first holding means from any rotation due to steering torque thereby permitting the cab to be tilted.

2. The apparatus of claim 1 wherein the attachment means further comprises a plate fixedly attached to the holding means, a pin, securely mounted on the plate, extending away from the holding means, a stand, fixedly attached to the tilt cab, having edges defining a slot into which the pin is slidably and pivotally engaged thereby permitting the gear means enough freedom to allow the cab to tilt.

3. The apparatus of claim 2 wherein the slot further comprises a first slot which is greater in width than the lower steering shaft for providing ample clearance for angular displacement of the lower shaft when the cab is tilted and a second slot, closely dimensioned to approximate the diameter of the pin, for providing a close fit of the pin in the slot thereby restricting any turning of the first holding means due to steering torque.

4. The apparatus of claim 1 wherein the attachment means further comprises a plate fixedly attached to the first holding means having edges defining a slot, a stand fixedly attached to the tilt cab, a pin securely mounted on the stand extending into the slot where it is slidably and pivotally engaged thereby permitting the gear means enough freedom to allow the cab to tilt while restricting any turning of the first holding means due to steering torque.

5. In a tilt cab vehicle having directing means for governing the angular direction of steerable wheels upon which the vehicle travels, torque transfer means for transferring steering torque to the directing means, a first manually operable steering control means, located within the tilt cab, of the type including a lower modified steering shaft, connected to the torque transfer means by a universal joint for generating said steering torque, the improvement comprising a second manually operable steering control means within the tilt cab positionally displaced from the first control means, of the type including a steering shaft housing fixedly attached to the cab, a second steering shaft constrained by the shaft housing to axial rotation, and a manually operable steering handle fixedly attached to the steering shaft, for alternatively generating said steering torque, a rod, adapted to be extended, operably interconnecting the first and second control means for transferring steering torque from the second control means to the first control means, a first worm and worm-wheel gear means, encompassing said lower steering shaft, connected to the lower steering shaft by a keyed collar and set screw, and connected to the rod by a keyed, slidable, and universally jointed means for allowing skew motion while restricting axial rotation of the first gear means relative to the rod, for transferring steering torque generated at the second control means from the rod to the lower steering shaft, a second worm and worm-wheel gear means, connected to the rod by a keyed, slidable, and universally jointed means for allowing skew motion while restricting axial rotation of the rod relative to the second gear means, connected to said second steering shaft by a keyed collar and set screw, for transferring steering torque generated at the second control means from the second steering shaft to the rod, a first and second holding means each aligning the first and second gear means respectively for ensuring the correct intermeshing of the associated gear means while protecting the gear means from foreign matter, the second holding means being fixedly attached to the cab, and an attachment means, interconnecting the first holding means and the tilt cab, comprising a plate fixedly attached to the first holding means, a pin securely mounted on the plate extending away from the first holding means and a stand fixedly attached to the tilt cab having edges defining a slot into which the pin is slidably and pivotally engaged, for restricting the first holding means from any rotation due to steering torque while slidably and pivotally attaching the first holding means to the tilt cab thereby permitting the cab to be tilted.

* * * * *